United States Patent
Zampiello (10) Patent No.: US 9,467,417 B2
(45) Date of Patent: Oct. 11, 2016

(54) SYSTEM AND METHOD FOR LOGGING COMMUNICATIONS

(71) Applicant: AT&T INTELLECTUAL PROPERTY I, L.P., Atlanta, GA (US)

(72) Inventor: Geoffrey Zampiello, Norwalk, CT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/946,107

(22) Filed: Nov. 19, 2015

(65) Prior Publication Data

US 2016/0072765 A1    Mar. 10, 2016

Related U.S. Application Data

(63) Continuation of application No. 11/877,790, filed on Oct. 24, 2007.

(51) Int. Cl.
*H04L 29/12* (2006.01)
*H04L 29/06* (2006.01)
*G06F 17/30* (2006.01)
*H04L 29/08* (2006.01)

(52) U.S. Cl.
CPC ..... *H04L 61/2514* (2013.01); *G06F 17/30864* (2013.01); *H04L 29/12367* (2013.01); *H04L 63/08* (2013.01); *H04L 63/1425* (2013.01); *H04L 63/30* (2013.01); *H04L 63/308* (2013.01); *H04L 67/104* (2013.01); *H04L 67/24* (2013.01)

(58) Field of Classification Search
CPC .......................... H04L 47/2441; H04L 47/10
See application file for complete search history.

(56) References Cited

U.S. PATENT DOCUMENTS

| | | | |
|---|---|---|---|
| 7,151,772 B1 | 12/2006 | Kalmanek, Jr. et al. | |
| 2001/0044903 A1 | 11/2001 | Yamamoto et al. | |
| 2002/0114333 A1* | 8/2002 | Xu | H04L 29/125 370/392 |
| 2004/0255126 A1* | 12/2004 | Reith | H04L 63/083 713/183 |
| 2005/0174937 A1 | 8/2005 | Scoggins et al. | |
| 2006/0212518 A1* | 9/2006 | Bailey | H04L 12/581 709/205 |
| 2008/0117916 A1 | 5/2008 | Hwang | |
| 2008/0256192 A1* | 10/2008 | Pinard | G06Q 30/02 709/206 |
| 2009/0041011 A1 | 2/2009 | Sheppard | |

* cited by examiner

*Primary Examiner* — Jackie Zuniga Abad
(74) *Attorney, Agent, or Firm* — Akerman LLP; Michael K. Dixon; Mammen (Roy) P. Zachariah, Jr.

(57) ABSTRACT

A method for logging communication includes determining when a target user is active and identifying an access device and private Internet Protocol (IP) address associated with the target user when the target user is active. The method further includes causing the access device to provide traffic information associated with the target user to a logging device.

20 Claims, 8 Drawing Sheets

SYSTEM AND METHOD FOR LOGGING COMMUNICATIONS

CROSS REFERENCE TO RELATED APPLICATIONS

This application is a continuation of and claims the benefit of U.S. patent application Ser. No. 11/877,790 filed Oct. 24, 2007, which is hereby incorporated by reference in its entirety.

FIELD OF THE DISCLOSURE

The present disclosure generally relates to communications networks, and more particularly relates to systems and methods for logging communications.

BACKGROUND

The Communications Assistance for Law Enforcement Act (CALEA) requires service providers to assist law enforcement in the performance of electronic surveillance pursuant to a court order or other lawful authorization. However, logging network activity can be a labor intensive and difficult process. A user's Internet Protocol (IP) address can change when the user disconnects a session or re-establishes a session. Additionally, the user's activity may be combined with activity from other users, such as by network address translation (NAT), so as to appear to originate from a single public IP address.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
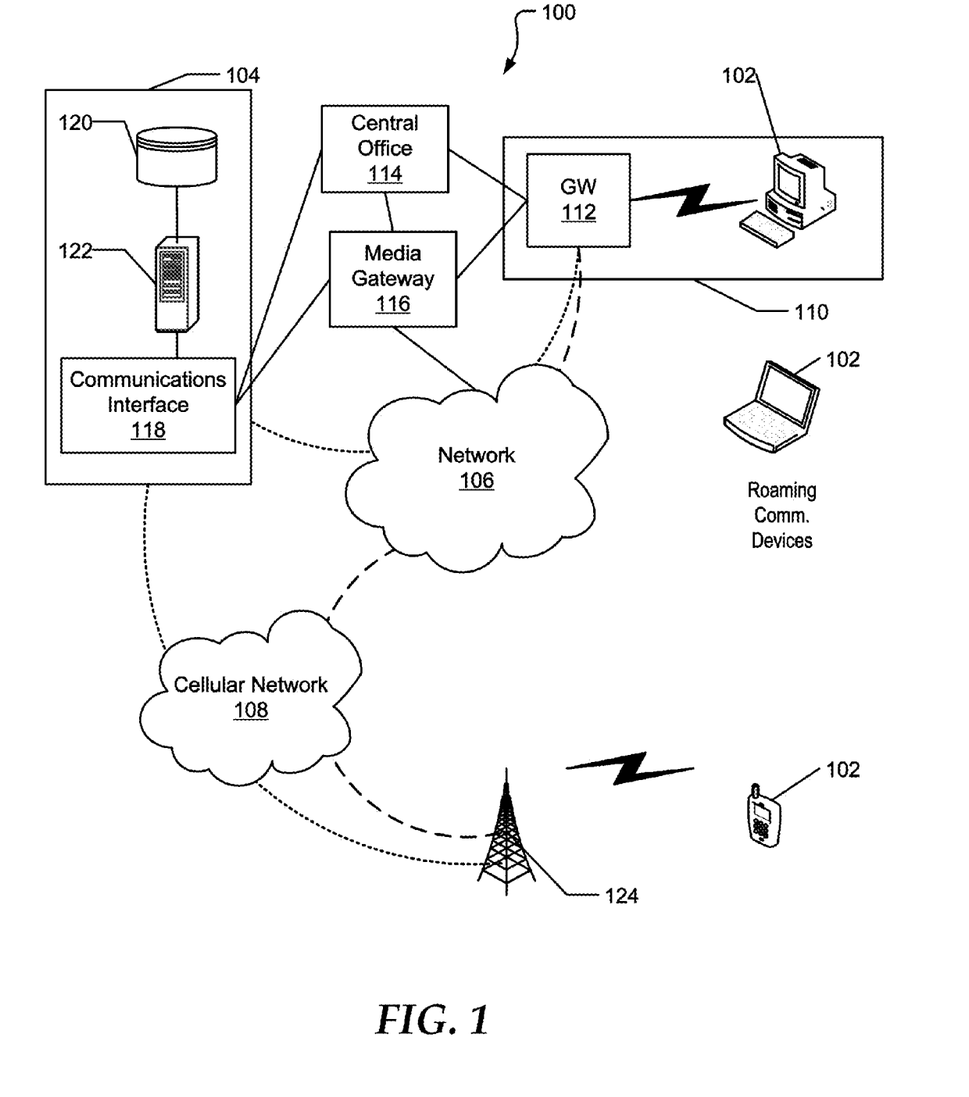
FIGS. 1 and 2 depict exemplary embodiments of a communication system.

FIG. 1 depicts an exemplary embodiment of a communication system 100 employing mobile and/or fixed communication devices 102 communicating by way of wireless access points (WAPs) and/or wired infrastructure. The communication system 100 also includes other communication devices and/or a web server or network proxy 104.

The communication device 102 can be a multimode communication device, such as a multimode Voice over Internet Protocol (VoIP) terminal. However, the present disclosure contemplates the use of other types of communication devices, including other types of voice, video, and data devices. The communication system 100 includes a packet-switched network, such as an Internet Service Provider (ISP) network 106. The network 106 can be coupled to the network proxy 104, a cellular network 108 and network elements located in one or more of the buildings 110 representing an enterprise or residence.

In an enterprise setting, the building 110 can include a gateway 112 that provides voice and/or video connectivity services between communication devices 102, such as VoIP terminals or other forms of communication devices of enterprise personnel, and other devices of network 106, such as web servers. In a residential setting, the gateway 112 may be a residential gateway coupled to a central office 114 utilizing conventional telephonic switching for processing calls with third parties.

The network proxy 104 can be used to control operations of a media gateway 116, the central office 114 and the gateway 112. Communications between the network proxy 104, the communication devices 102 and other network elements of the communication system 100 can conform to any number of signaling protocols such as session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 104 can include a communications interface 118 that utilizes common technology for communication over an IP interface with the communication system 100, the media gateway 116, the cellular network 108, and/or the gateway 112. By way of the communications interface 118, the network proxy 104 can direct by common means any of the foregoing network elements to establish packet switched data, voice, and/or video connections between communication devices 102 distributed throughout the communication system 100. The network proxy 104 can further comprise a memory 120 (such as a high capacity storage medium) embodied in this illustration as a database, and a controller 122, such as a desktop computer or scalable server, that makes use of computing technology for controlling operations of the network proxy 104. The network proxy 104 can operate as an IP Multimedia Subsystem (IMS) conforming in part to protocols defined by standards bodies such as Third Generation Partnership Protocol (3GPP).

Under the control of the network proxy 104, the media gateway 116 can link packet-switched and circuit-switched technologies such as the cellular network 108 (or central office 114) and the network 106, such as an ISP network. The media gateway 116 can conform to a media gateway control protocol (MGCP) also know as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 100. The media gateway 116 can therefore support hybrid communication environments for communication device 102, including VoIP terminals.

The central office 114 can house common network switching equipment for distributing local and long-distance telecommunication services supplied by network 106 to buildings 110. Telecommunication services of the central office 114 can includes traditional Plain Old Telephone Service (POTS) and broadband services such as HDTV, DSL, VoIP, Internet Protocol Television (IPTV), Internet services, and so on. The communication system 100 can utilize common computing and communications technologies to support circuit-switched and/or packet-switched communications.

The cellular network 108 can support voice and data services over a number of access technologies such as GSM-GPRS, EDGE, CDMA-1x, UTMS, WiMAX, software defined radio (SDR), and other know and future technologies. The cellular network 108 can be coupled to base stations 124 under a frequency-reuse plan for communicating over-the-air with roaming communication devices 102.

Figure 2:
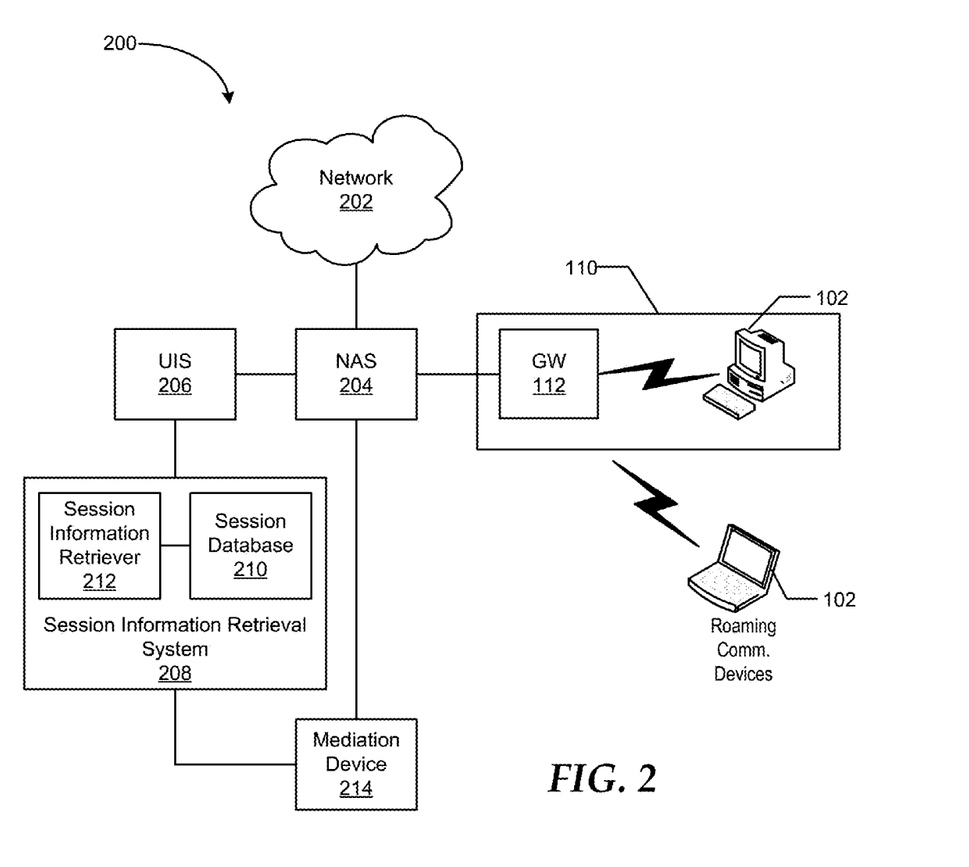

FIG. 2 depicts an exemplary embodiment of a communication system 200 employing mobile and/or fixed communications devices 102 communication by way of WAPs and/or wired infrastructure with other communication devices of a network 202 through use of one or more network access servers (NASs) 204, such as a Broadband Remote Access Server (BRAS). Communication system 200 can be overlaid or operably coupled with communication system 100 as another representative embodiment of the communication system.

NAS 204 can include various components and can utilize various protocols, such as Point-to-Point Protocol (PPP), to communicate with, and provide network access to, the communication devices 102. NAS 204 can aggregate traffic from a number of access nodes throughout the network 202, such as Digital Subscriber Line Access Multiplexers (DSLAMs).

NAS 204 can communicate with a user information server (UIS) or database 206, such as a Remote Authentication Dial In User Server (RADIUS) server, for authentication, authorization, and/or accounting (AAA) services related to the network access to be provide to each of the communication device 102. For example, the NAS server 204 can communicate with the UIS 206 any identification information related to the communication device 102 that is requesting access of the network 202. Various protocols can be utilized for the communication of the identification information such as the RADIUS protocol. The UIS 206 can authenticate the communication device 102 based upon a number of authentication schemes, such as Password Authentication Protocol (PAP), Challenge-Handshake Authentication Protocol (CHAP) or Extensible Authentication Protocol (EAP).

UIS 206 can retrieve and maintain other information related to the communication device 102, such as session's start and/or end time, the number of packets transferred during the session, the volume of data transferred during the session and the reason for the session ending. In one embodiment, the UIS 206 can be a RADIUS server that can be used by VoIP service providers, such as for transmitting login credentials of a SIP end point (e.g., a broadband phone) to a SIP Registrar using digest authentication, and then to the RADIUS server using RADIUS protocol.

Communication system 200 can include a session information retrieval system 208, which has a session information database 210 and a session information retriever 212. The session information retrieval system 208 can be remotely positioned from the NAS 204 and/or the UIS 206. However, the session information retrieval system 208 may be incorporated into one or both of the NAS 204 and/or the UIS 206, including sharing one or more components with the NAS 204 and/or UIS 206. The session information database 210 and session information retriever 212 can include various components (e.g., controller, communication interface, and memory), and can utilize various protocols to communicate with the UIS 206, as well as with one or more mediation devices 214, such as a Law Enforcement Agency (LEA) device or server.

Figure 3:
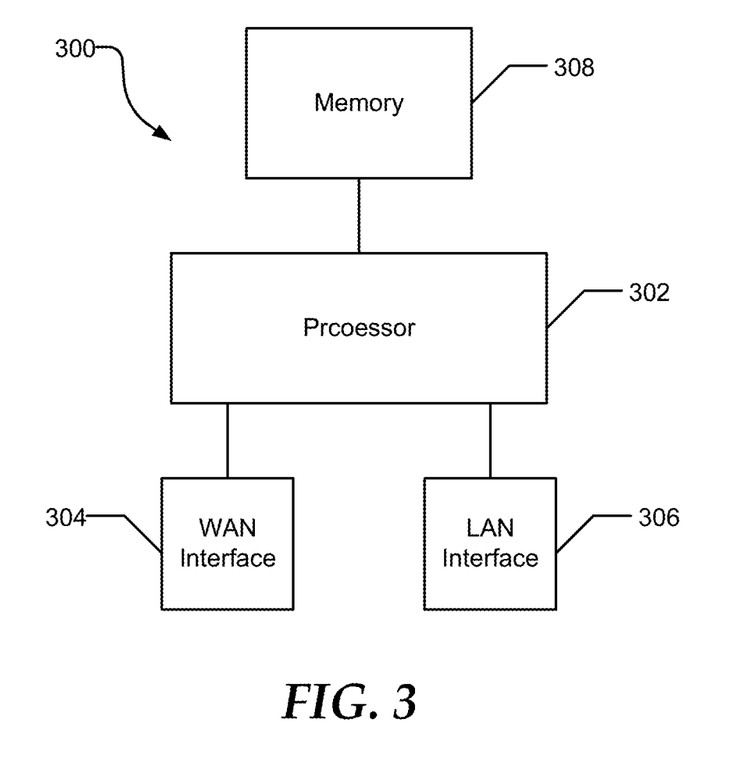
FIG. 3 is a block diagram illustrating an exemplary embodiment of an access point.

FIG. 3 shows an access point (AP) 300. The AP 300 may be a wireless access point, such as the WAP 178 or a gateway, such as the gateway 112. The AP 300 can have a processor 302, a WAN interface 304, a LAN interface 306, and a memory 308. The WAN interface 304 can connect to a network, such as network 106, through a coax cable, a twisted pair, a fiber optic cable, or a wireless link. Communication devices 102, such computers, VoIP telephones, and set top boxes, can connect to the LAN interface 306 such as through a coax cable, a twisted pair, a fiber optic cable, or a wireless link. The AP 300 can provide network services to the LAN devices, such as firewall services, routing services, dynamic host configuration protocol (DHCP) services, NAT services, and domain name system (DNS) services.

In an exemplary embodiment, the AP 300 may communicate with a UIS, such as UIS 206. A communication device 102 may authenticate with the UIS 206 in order to access the public network. Upon authentication, the UIS 206 can instruct the AP 300 to provide network resources to the communication device 102. Additionally, the AP 300 may provide NAT services, as described in more detail below.

Figure 4:
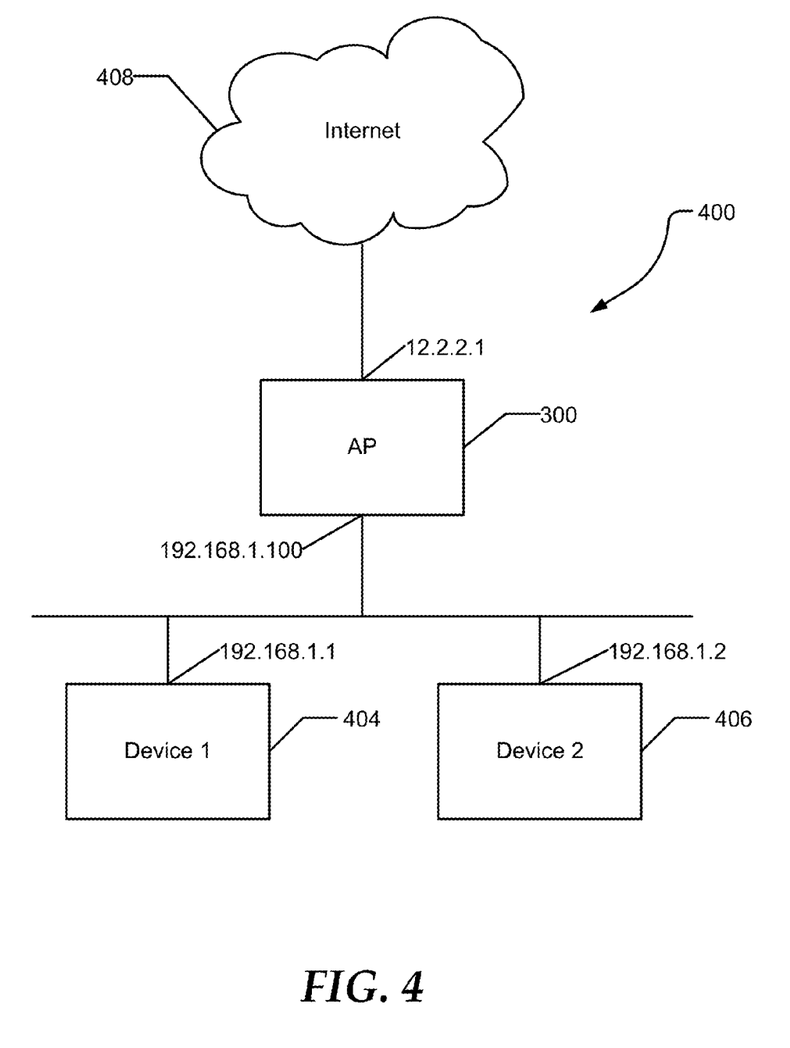
FIG. 4 is a block diagram of a network utilizing NAT.
Figure 5:
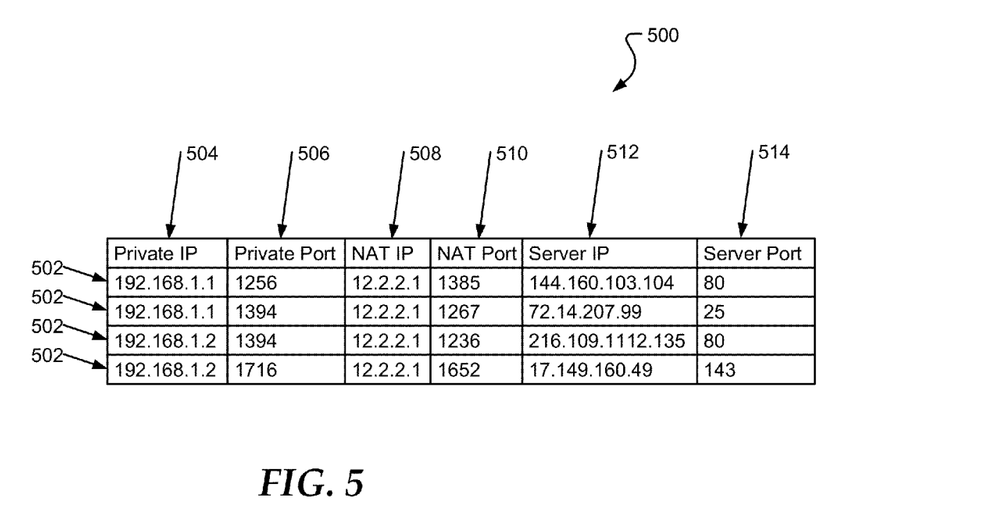
FIG. 5 is an exemplary embodiment of a NAT table.

FIGS. 4 and 5 illustrate an exemplary embodiment of a network utilizing NAT. The AP 300 can connect LAN devices 404 and 406, such as communication devices 102, to the public network 408, such as the Internet. AP 300 may have a public IP address of 12.2.2.1 and a private IP address of 192.168.1.100. Device 404 may have a private IP address of 192.168.1.1 and device 406 may have a private IP address of 192.168.1.2. A public IP address can be routable from the public network 408 whereas a private IP address may not be routable from the public network 408. The NAT provided by AP 300 allows devices 404 and 406 to utilize the public IP address of the AP 300 when communicating with devices on the public network 408.

When device 404 sends a request to a device on the public network 408, AP 300 can replace the source IP address, i.e., the private IP address of device 404, with the public IP address of AP 300. Additionally, the AP 300 may replace the source port of device 404 with a NAT port of the AP 300. When a reply is sent to the public IP address and the NAT port of AP 300, AP 300 can replace the destination IP address, i.e., the public IP address of the AP 300, with the private IP address of device 404. Additionally, the AP 300 can replace the destination port, i.e., the NAT port of the AP 300, with the port of device 404. The AP 300 may forward the modified reply to the device 404.

The AP 300 can store NAT information in a NAT table, such as exemplary NAT table 500 shown in FIG. 5. The NAT table 500 stores information in a NAT table entry 502 for each of a plurality of connections. For each NAT table entry 502, the NAT table 500 can include a private IP address 504 and a private port 506 for device 404 or 406, a NAT address 508 and a NAT port 510 of the AP 300, and a server IP address 512 and a server port 514 for a server communicating with device 404 or 406. When the AP 300 receives an incoming packet, the AP 300 may match the source address, source port, destination address, and destination port of the incoming packet to the respective server IP 512, server port 514, NAT address 508, and NAT port 510 of a NAT table entry 502. When the AP 300 receives an outgoing packet, the AP 300 may match the source address, source port, destination address, and destination port of the outgoing packet to the respective private IP 504, private port 506, server IP address 512, and server port 514 of a NAT table entry 502.

Figure 6:
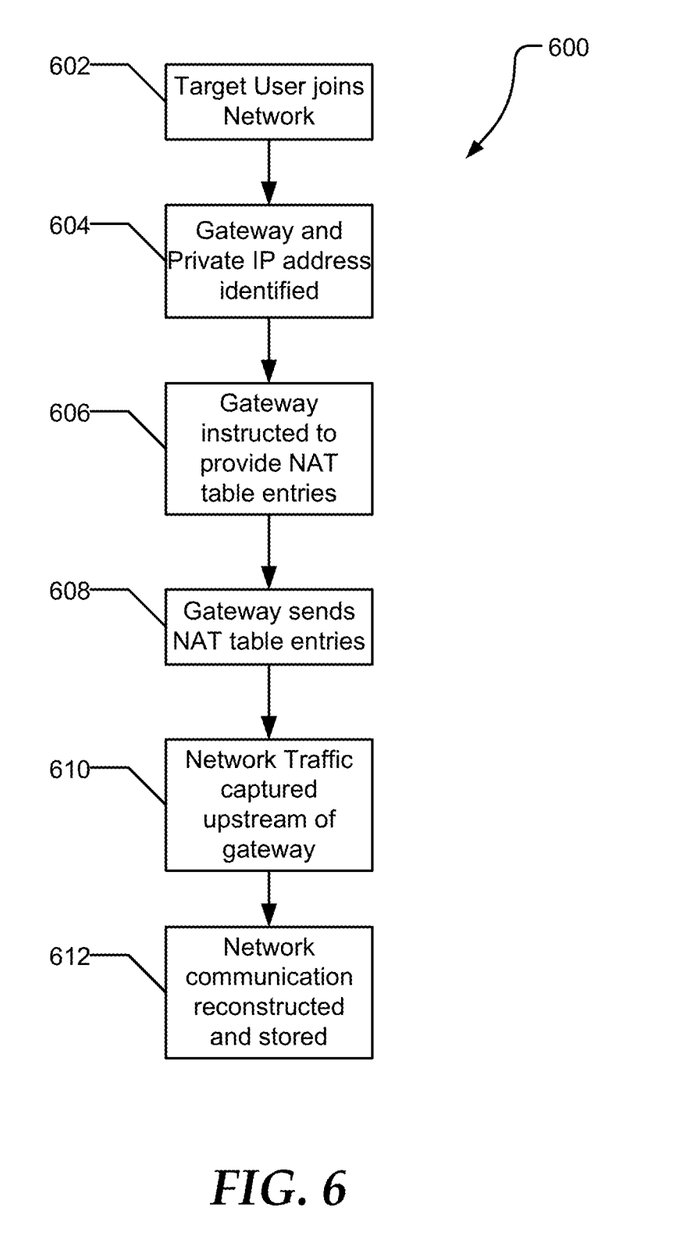
FIG. 6 is a flow diagram illustrating a method of capturing traffic of a user in a NAT environment.

FIG. 6 illustrates an exemplary method for capturing traffic of a user in a NAT environment. At 602, the target user can join a network. In a wireless environment, the target user may be required to provide a wireless network password. Alternatively, the wireless network may be an open network and wireless traffic may rely on other methods for security. For example, the entire session may be secured, such as by using a virtual private network (VPN), or individual communications may be secured, such as through the use of various cryptographic protocols. Further, the target user's device may request a private IP address from the AP 300, such as by DHCP. Additionally, authentication may be required before the target user can access the network. For example, the UIS 206 may authenticate the target user based on various authentication schemes. At 604, the AP 300 and the private IP address may be identified to be associated with a target user. For example, the session information retrieval system 208 may receive active session information from the UIS 206 and compare the active session information to a list of targeted users. The UIS 206 may provide the active session information each time a communications device 116 is authenticated, or the UIS 206 may provide all current active session information on a periodic basis. Alternatively, the session information retrieval system 208 may periodically query the UIS 206 to determine active session information related to target users. The active session information can include an AP identifier.

The AP 300 can be instructed to provide the NAT table entries associated with the private IP address of the target user, as illustrated at 606. At 608, the AP can provide the NAT table entries. For example, the AP 300 may provide all NAT table entries associated with a private IP address. Alternatively, the AP 300 may provide only NAT table entries associated with the private IP address matching specific types of network traffic, such as email, VoIP, or P2P file sharing. The NAT table entries can be provided to the session information retrieval system or to a logging device, such as through a connection secured by various cryptographic protocols. The logging device may be incorporated into NAS 204 or may be a separate device capable of logging traffic passing through the NAS 204. Alternatively, the logging device may be located anywhere upstream of the NAS 204 or between the NAS 204 and the AP 300 such that the logging device is capable of accessing substantially all traffic going to and from the AP 300. As illustrated at 610, the logging device may capture network traffic matching the NAT table entries provided by the AP 300. At 612, the captured network traffic can be used to reconstruct network communication of the target user and the network communication can be stored for additional analysis. The captured network traffic may be reconstructed and stored by any of the logging device, the session information retrieval system 208, or the mediation device 214. Additionally, communication between any of the logging device, the session information retrieval system 208, or the mediation device 214 can be secured using various cryptographic protocols.

Figure 7:
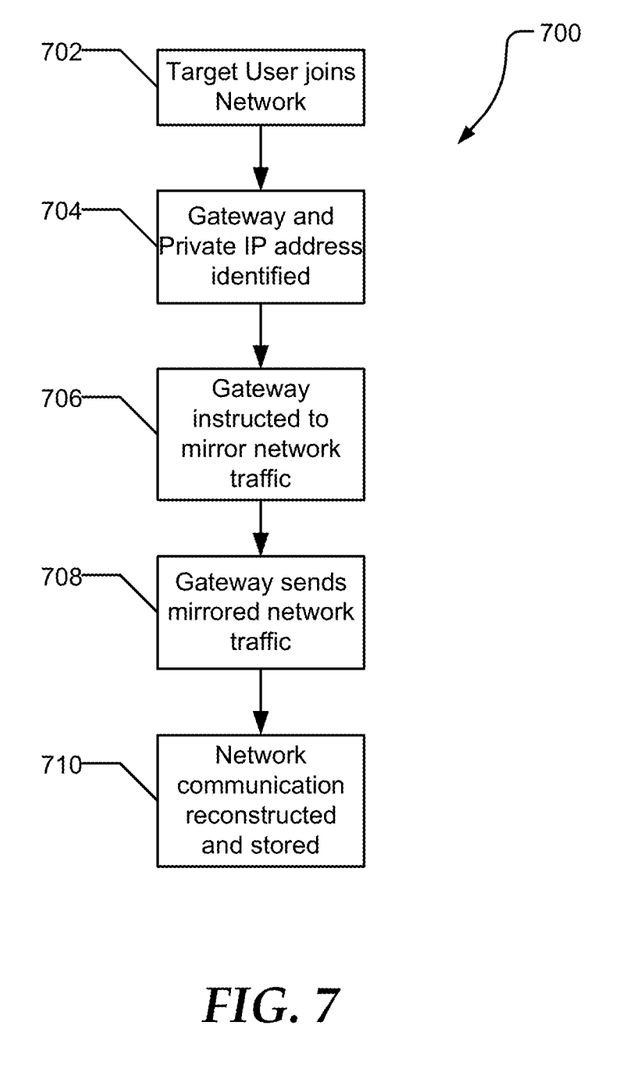
FIG. 7 is a flow diagram illustrating an alternate method of capturing traffic of a user in a NAT environment.

FIG. 7 illustrates an alternate method for capturing network traffic of a user in a NAT environment. At 702, the target user can join the network, as previously discussed. At 704, the private IP address and the AP 300 associated with the target user may be identified. The AP 300 may be instructed to mirror the network traffic of the target user, as shown at 706. The AP 300 may send copies of all network packets related to the target user's device to a logging device, as shown at 708. The logging device may be the session information retrieval system 208, the mediation device 275, or another device for receiving the mirrored network traffic. Communication between the AP 300 and the logging device can be encrypted through various cryptographic protocols. At 710, the logging device can reconstruct the network communication from the copies of the network packets and store the network communication for further analysis. When the logging device is separate from the mediation device 214, the reconstructed network communication may be sent to the mediation device 214, or the mediation device 214 may be provided access to the reconstructed network communication stored on the surveillance server. Typically, access to the reconstructed network communication is read-only access in order to preserve the forensic value of the reconstructed network communication.

Figure 8:
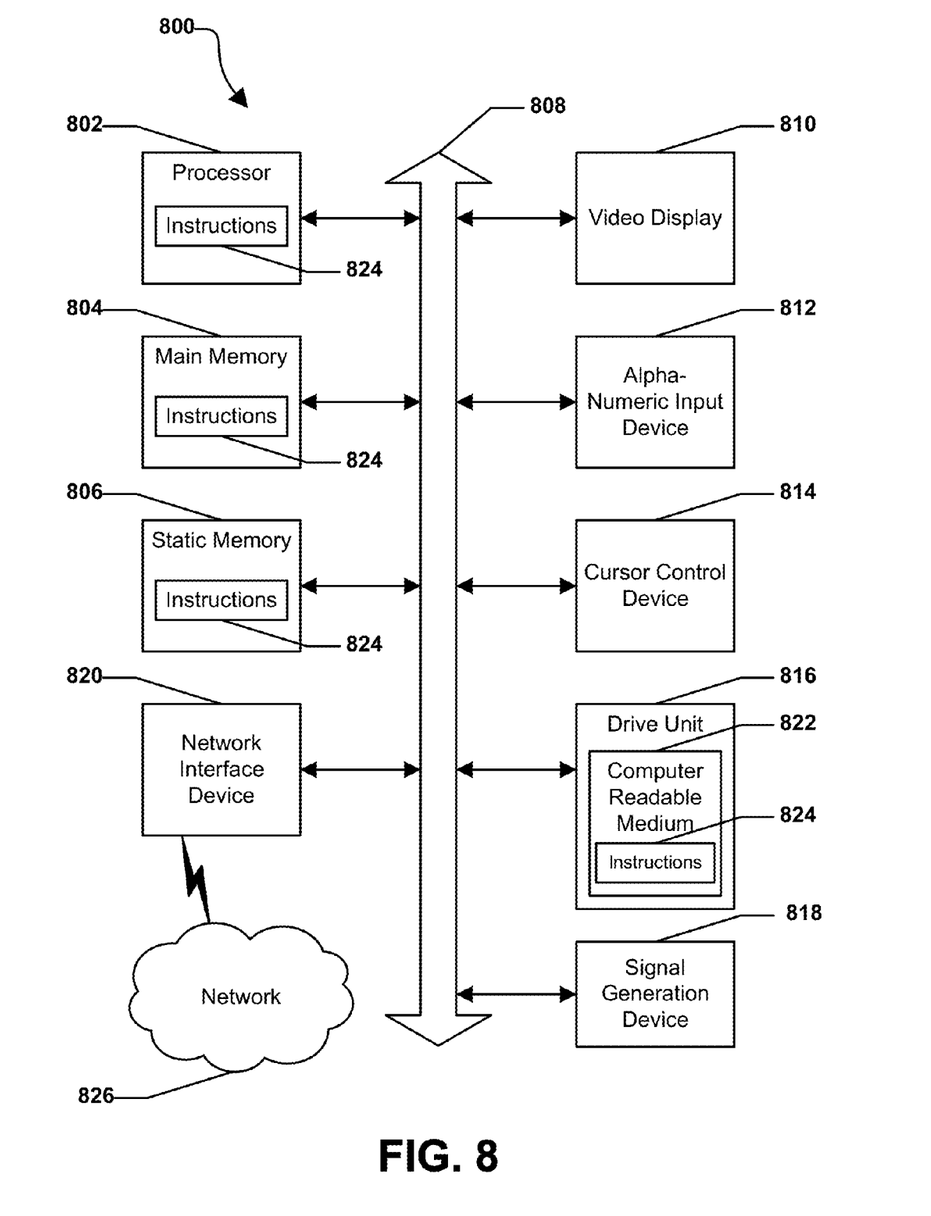
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 27 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
    a memory that stores instructions;
    a processor that executes the instructions to perform operations, the operations comprising:
        determining when a target user is active by comparing active session information to a list of targeted users, wherein the active session information is received in response to a communication device of the target user being authenticated, wherein the active session information comprises an access point identifier associated with an access point, an indication as to a reason for ending a session associated with the active session information, a quantity of packets transferred during the session associated with the active session information, and a volume of data transferred during the session;
        identifying the access point and a private internet protocol address associated with the target user when the target user is determined to be active and when network traffic associated with the target user is peer-to-peer network traffic; and
        logging, at the access point, traffic information including a network address translation table entry associated with the private internet protocol address, wherein the network address translation table entry is included in the traffic information only if the network address translation table entry matches a network traffic type associated with the private internet protocol address.

2. The system of claim 1, wherein the operations further comprise providing, from the access point, a network address translation between the private internet protocol address and a public internet protocol address associated with the access point.

3. The system of claim 1, wherein the operations further comprise receiving the network address translation table entry associated with the private internet protocol address associated with the target user.

4. The system of claim 1, wherein the operations further comprise receiving the traffic information including the network translation table entry associated with the private internet protocol address.

5. The system of claim 1, wherein the operations further comprise reconstructing a communication based on the traffic information.

6. The system of claim 1, wherein the operations further comprise retrieving a session start time and a session end time for the session associated with the active session information.

7. The system of claim 1, wherein the operations further comprise identifying the access point and private internet protocol address by querying a remote authentication server.

8. The system of claim 1, wherein the operations further comprise causing the access point to mirror a copy of the network traffic associated with the target user.

9. The system of claim 1, wherein the operations further comprise causing the access point to replace a network address translation port of the access point with a port of the communication device.

10. The system of claim 1, wherein the operations further comprise causing the access point to replace a public internet protocol address with the private internet protocol address when receiving a reply intended for the communication device.

11. The system of claim 1, wherein the operations further comprise retrieving information indicating the quantity of packets transferred during the session associated with the active session information.

12. A method, comprising:
    determining, by utilizing instructions from a memory that are executed by a processor, when a target user is active by comparing active session information to a list of targeted users, wherein the active session information is received in response to a communication device of the target user being authenticated, wherein the active session information comprises an access point identifier associated with an access point, a session start time for a session associated with the active session information, a session end time for the session, a quantity of packets transferred during the session associated with the active session information, and a volume of data transferred during the session;

identifying the access point and a private internet protocol address associated with the target user when the target user is determined to be active and when network traffic associated with the target user is peer-to-peer network traffic; and logging, at the access point, traffic information including a network address translation table entry associated with the private internet protocol address, wherein the network address translation table entry is included in the traffic information only if the network address translation table entry matches a network traffic type associated with the private internet protocol address.

13. The method of claim 12, further comprising receiving an indication as to a reason for ending the session associated with the active session information.

14. The method of claim 12, further comprising causing the access point to mirror a copy of the network traffic associated with the target user.

15. The method of claim 12, further comprising reconstructing a communication based on the traffic information.

16. The method of claim 15, further comprising storing the communication reconstructed based on the traffic information.

17. The method of claim 12, further comprising providing, from the access point, a network address translation between the private internet protocol address and a public internet protocol address associated with the access point.

18. The method of claim 12, further comprising accessing information indicating the quantity of packets transferred during the session associated with the active session information.

19. The method of claim 12, further comprising receiving the traffic information including the network translation table entry associated with the private internet protocol address.

20. A non-transitory computer-readable medium comprising instructions, which, when loaded and executed by a processor, cause the processor to perform operations, the operations comprising:

determining when a target user is active by comparing active session information to a list of targeted users, wherein the active session information is received in response to a communication device of the target user being authenticated, wherein the active session information comprises an access point identifier associated with an access point, a quantity of packets transferred during the session associated with the active session information, and a volume of data transferred during the session;

identifying the access point and a private internet protocol address associated with the target user when the target user is determined to be active and when network traffic associated with the target user is peer-to-peer network traffic; and logging, at the access point, traffic information including a network address translation table entry associated with the private internet protocol address, wherein the network address translation table entry is included in the traffic information only if the network address translation table entry matches a network traffic type associated with the private internet protocol address.

* * * * *